US005539190A

United States Patent [19]

Manduley

[11] Patent Number: 5,539,190

[45] Date of Patent: Jul. 23, 1996

[54] SYSTEM AND METHOD FOR SECURED METERING OF MAIL

[75] Inventor: Flavio M. Manduley, Woodbury, Conn.

[73] Assignee: Pitney Bowes, Stamford, Conn.

[21] Appl. No.: 354,333

[22] Filed: Dec. 12, 1994

[51] Int. Cl.[6] .......... G06K 5/00

[52] U.S. Cl. .......... 235/380; 235/375; 235/378

[58] Field of Search .......... 235/375, 378, 235/380; 209/584, 900; 101/71; 364/464.2

[56] References Cited

U.S. PATENT DOCUMENTS

| | | | |
|---|---|---|---|
| 4,725,718 | 2/1988 | Sansone | 235/495 |
| 4,743,747 | 5/1988 | Fougere et al. | 235/494 |
| 4,760,532 | 7/1988 | Sansone et al. | 364/464 |
| 4,853,869 | 8/1989 | Durst, Jr. et al. | 364/478 |
| 4,978,839 | 12/1990 | Chen | 235/375 |
| 4,980,542 | 12/1990 | Jackson | 235/375 |
| 5,224,046 | 6/1993 | Kim | 364/464.02 |
| 5,291,002 | 3/1994 | Agnew | 235/375 |
| 5,329,102 | 7/1994 | Sansone | 235/375 |
| 5,367,148 | 11/1994 | Storch | 235/375 |

*Primary Examiner*—Donald T. Hajec
*Assistant Examiner*—Karl Frech
*Attorney, Agent, or Firm*—Charles R. Malandra, Jr.; Melvin J. Scolnick

[57] ABSTRACT

In accordance with the present invention, a system for securely metering mailpieces includes a plurality of local stations and a data center having a central database in communication with a Post Office. Each of the local stations includes apparatus for reading indicia printed on a mailpiece, apparatus for reading information from a mailer identification card, apparatus for requesting transaction authorization from a postal system and for initiating communication to the data center of information read from the indicia and the mailer identification card. Each local station also includes a secured pouch for securely holding the mailpiece when the mailpiece is accepted by the data center. The data center authorizes acceptance of the mailpiece after comparing the indicia information and mailer identification card information to records in the central database to verify that there are sufficient funds or credit available to the mailer which satisfy an amount of postage in the indicia. Once verified, the data center issues authorization of the mailpiece and debits the account of the mailer for an amount equal to the amount of postage.

13 Claims, 5 Drawing Sheets

FIG. 6

| METHOD | PAYMENT | APPLICATION | CONVENIENCE | SECURITY | BENEFIT | DRAWBACK |
|---|---|---|---|---|---|---|
| STAMPS | PREPAID<br>• PURCHASED FROM P.O. OR CONVENIENCE STORE | VERY LOW - LOW VOLUME MAILER | LOW - MEDIUM<br>• STAMPS MUST BE PURCHASED | LOW<br>• STAMPS ARE SAME AS CASH, DIFFICULT TO CONTROL AND MAY BE SUBJECT TO MISUSE<br>• COUNTERFEITING POSSIBLE | • NO SPECIAL APPLICATION OR MACHINERY NEEDED<br>• "PERSONALIZED LOOK" | • REQUIRES REPEATED TRIPS TO P.O. OR CONVENIENCE STORE<br>• EASILY MISPLACED<br>• MUST HAVE PROPER DENOMINATION TO AVOID OVERPOSTING |
| METER | PREPAID<br>• EITHER DIRECTLY AT P.O. WINDOW, OR VIA POSTAGE BY PHONE ACCOUNT | LOW - VERY HIGH VOLUME MAILER<br>• APPLICATIONS RANGE FROM IN-HOME CASUAL/BUSINESS TO HIGHLY AUTOMATED PRODUCTION MAIL | MEDIUM<br>• REQUIRES PERIODIC TRIP TO P.O. TO VERIFY REGISTERS AND LOCATION BY USER<br>• REMOTE LOADING<br>• STILL HAS INSPECTION ISSUES | MEDIUM - HIGH<br>• STAND-ALONE METER MAY BE MISUSED/STOLEN<br>• METERS REQUIRING BASE LESS SUBJECT TO MISUSE<br>• DIGITAL POSSIBLE INDICIA COUNTERFEITING | • PRECANCELLED AND DATED<br>• SPEEDS MAIL THRU. P.O. PROCESSING<br>• ABLE TO APPLY EXACT POSTAGE AMOUNTS<br>• "PROFESSIONAL IMAGE" | • METER RENTAL COST<br>• EQUIPMENT COST<br>• SECURITY ISSUES<br>• EQUIPMENT LOSSES |
| PERMIT | PREPAID/TRUST ACCOUNT<br>• MAY BE LINKED TO OTHER POSTAGE PAYMENT ACCOUNTS | HIGH - VERY HIGH VOLUME MAILER<br>• USUALLY USED WITH PREPRINTED MAILER/ENVELOPE | MEDIUM - HIGH<br>• NORMALLY USED IN AUTOMATED, PRESORTED NON-1ST CLASS ENVIRONMENT<br>• ALLOWS FOR ADDITIONAL DISCOUNTING | HIGH<br>• PERMIT MAIL CLOSELY MONITORED, AND AUDITED BY P.O. | • DISCOUNTS APPLY<br>• NO MECHANICALLY APPLIED INDICIA REQUIRED<br>• PRECANCELLED | • "LOW VALUE" OR "JUNK MAIL" IMAGE |
| MANIFEST | PAYMENT MADE AT TIME OF P.O.<br>• MOVING TO EFT, AND EDI FROM BANK ACCOUNTS | HIGH - VERY HIGH VOLUME MAILER<br>• EXTENDING TO PARCEL SHIPMENTS AND EXPRESS MAIL | HIGH<br>• NORMALLY USED IN AUTOMATED, COMPUTERIZED ENVIRONMENT | HIGH<br>• REQUIRES SELF-AUDIT PROCEDURES, AS WELL AS P.O ACCEPTANCE AUDIT | • NO MECHANICALLY APPLIED INDICIA REQUIRED<br>• PRECANCELLED | • CURRENTLY DIFFICULT TO GET INITIAL APPROVAL THROUGH LOCAL P.O.<br>• NON-STANDARDIZED ACCEPTANCE PROCEDURES |
| PRESENT INVENTION | PREPAID/TRUST ACCOUNT<br>• PREAUTHORIZED CREDIT; I.E., CREDIT CARD<br>• EDI | LOW - VERY HIGH VOLUME MAILER<br>• APPLICATIONS RANGE FROM IN-HOME CASUAL/BUSINESS TO HIGHLY AUTOMATED PRODUCTION MAIL<br>• IN ADDITION, IT OFFERS THE EQUIVALENT OF MULTIPLE VALUE PERMIT MAIL | • TREATED AS A BANK OF MONEY TRANSFER TRANSACTION | HIGH<br>• CONTROL AT CENTRAL LOCATION, AWAY FROM USER<br>• EASY TO BE MONITORED<br>• ACCEPTANCE BY P.O. ONLY AFTER GUARANTEED FUNDS ARE AVAILABLE<br>• P.O. NOT AFFECTED BY CONTERFEITED INDICIA<br>• MAIL ACCEPTED TO P.O. OR TRUCK OR SECURED POUCH OR MAILBAG ONLY AFTER CHECKING CREDIT | • COMPUTERIZED<br>• FUTURE ADVANTAGE WITH INFORMATION HIGHWAY<br>• NO SECURITY RISK TO P.O.<br>• STILL HOLDS BENEFITS OF DATED AND PRECANCELLED<br>• STILL APPLY FLEXIBLE POSTAGE<br>• FOR SHIPPING OR MAILING MANIFEST CAN BE DONE REMOTELY (MANIFEST SW IS DONE AWAY FROM CUSTOMER) BUT WITHIN MINIMUM AUDIT<br>• RATES CAN ALSO BE DONE REMOTELY<br>• SINCE IT REQUIRES PRINTOUT, ENCRYPTED INTO STILL CAN BE USED<br>• OPENS AVENUE FOR OTHER SERVICES | • NEW<br>• REQUIRES ACCEPTANCE BY P.O. |

SYSTEM AND METHOD FOR SECURED METERING OF MAIL

FIELD OF THE INVENTION

The present invention relates generally to a system for metering mail and, more particularly, to a system for improving the security of funds in a metered mail system.

BACKGROUND OF THE INVENTION

Metered mail processing systems have been in existence since the first postage meter was invented by Arthur H. Pitney. Since the issuance of U.S. Pat. No. 1,530,852 to Pitney in Mar. 24, 1925, the postage meter has had a steady evolution. Since the invention of the first postage meter, the processing of metered mail has evolved to highly automated systems in which manual intervention has been minimized. Notwithstanding this fact, security of funds has remained a primary concern to the various postal systems in the world (referred to herein as the "Posts"). Many improvements have been made in the security of the meters and in the processing of the metered mail to reduce the risk of fraud on the Posts. Such improvements have been successful at times in reducing the risk of fraud, however, the risk of fraud has heretofore not been eliminated.

Postage meters are mass produced devices for printing a defined unit value for governmental or private carrier delivery of parcels and envelopes. The term postage meter also includes other like devices which provide unit value printing such as a tax stamp meter. Postage meters include internal accounting devices which account for postage value, which postage value is stored within the meter. The accounting device accounts for both the recharging of the meter with additional postage value and the printing of postage by the meter printing mechanism. No external independent accounting system is available for accounting of the postage printed by the meter. Accordingly, postage meters must posses high reliability and security to avoid the loss of user or governmental funds.

Throughout the years, two general types of postage meters have been used: one that uses a rotatable print drum and is referred to as a rotary postage meter, and the other that uses a stationary print head and reciprocating platen and is referred to as a flat bed postage meter. More recently, there has been a change from a completely mechanical device to meters that incorporate electronic components extensively. New meters will include digital printheads for printing indicia on mailpieces.

Although there have been a number of changes in the design and structure of postage meters, one criteria remains constant—the need for absolute security. Since a postage meter prints postage value, absolute security of the meter is necessary to prevent the unauthorized printing of postage which thereby defrauds the Posts. Most security measures taken are of a physical nature. For example, in mechanical postage meters, security has been applied both to the printing position of the meter and to the accounting position. More recently, the use of systems including encryption techniques have been proposed to ensure that a digitally printed postage indicia is valid. Nevertheless, such encryption techniques merely supplement the physical security systems that have heretofore been used or suggested. The security measures used or proposed thus far reduce the risk associated with the unauthorized printing of postage, but do not eliminate the risk. Such risk is borne entirely by the Posts whether the postage is printed in a prepayment or post payment system.

Postage meters have performed satisfactorily in the past and continue to perform satisfactorily. However, with the advance of electronics, and in particular digital printing, the risk of unauthorized postage printing will remain, if not increase. As more security techniques are developed, more ways for avoiding such security are most likely to be developed as well. A postage system is needed that provides the absolute security desired by the Posts by eliminating the risk of unauthorized postage printing while still providing the flexibility and serviceability available today.

SUMMARY OF THE INVENTION

The present invention provides a system and method for secured metering of mail that eliminates the risk of fraud and misuse of postage meters that has always been on the Posts. The basic principle of the present invention is the removal of the currency aspect of metered mail while adding more security at a centralized location. The added security is accomplished by loading the mailpieces in a secured bag or tray (referred to herein as a "pouch") that communicates with a central database for authorization of funds transfer and mail acceptance. It will be seen that the system and method of the present invention prevents any fraud on the Posts because the total amount is debited from mailer's account based directly on the postage due for the mailpieces in the pouch.

In accordance with the present invention, a system for securely metering mailpieces includes a plurality of local stations and a data center having a central database in communication with a Post Office. Each of the local stations includes apparatus for reading indicia printed on a mailpiece, apparatus for reading information from a mailer identification card, apparatus for requesting transaction authorization from a postal system and for initiating communication to the data center of information read from the indicia and the mailer identification card. Each local station also includes a secured pouch for securely holding the mailpiece when the mailpiece is accepted by the data center. The data center authorizes acceptance of the mailpiece after comparing the indicia information and mailer identification card information to records in the central database to verify that there are sufficient funds or credit available to the mailer which satisfy an amount of postage in the indicia. Once verified, the data center issues authorization of the mailpiece and debits the account of the mailer for an amount equal to the amount of postage.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 6 table comparing various known systems and methods of applying postage to a mailpiece with the system and method of the present invention;

DETAILED DESCRIPTION OF THE PRESENT INVENTION

In describing the present invention, reference is made to the drawings, wherein there is seen a new system and method of securely metering mailpieces. The present invention provides a system and method in which the risk of fraud or misuse of a postage meter is on the mailer and not on the Posts.

The basic principle of the present invention is the removal of the currency aspect of metered mail while adding more security at a centralized location. The added security is accomplished by loading the mailpieces in a secured bag or tray (referred to herein as a "pouch") that communicates with a central database for authorization of funds transfer and mail acceptance. Tampering protection of the pouch is accomplished by authorizing acceptance and transfer by at least one secured smart card for the mailer, and preferably a second card for a post office employee. The codes of the cards are preferably updated with each transaction.

Figure 1:
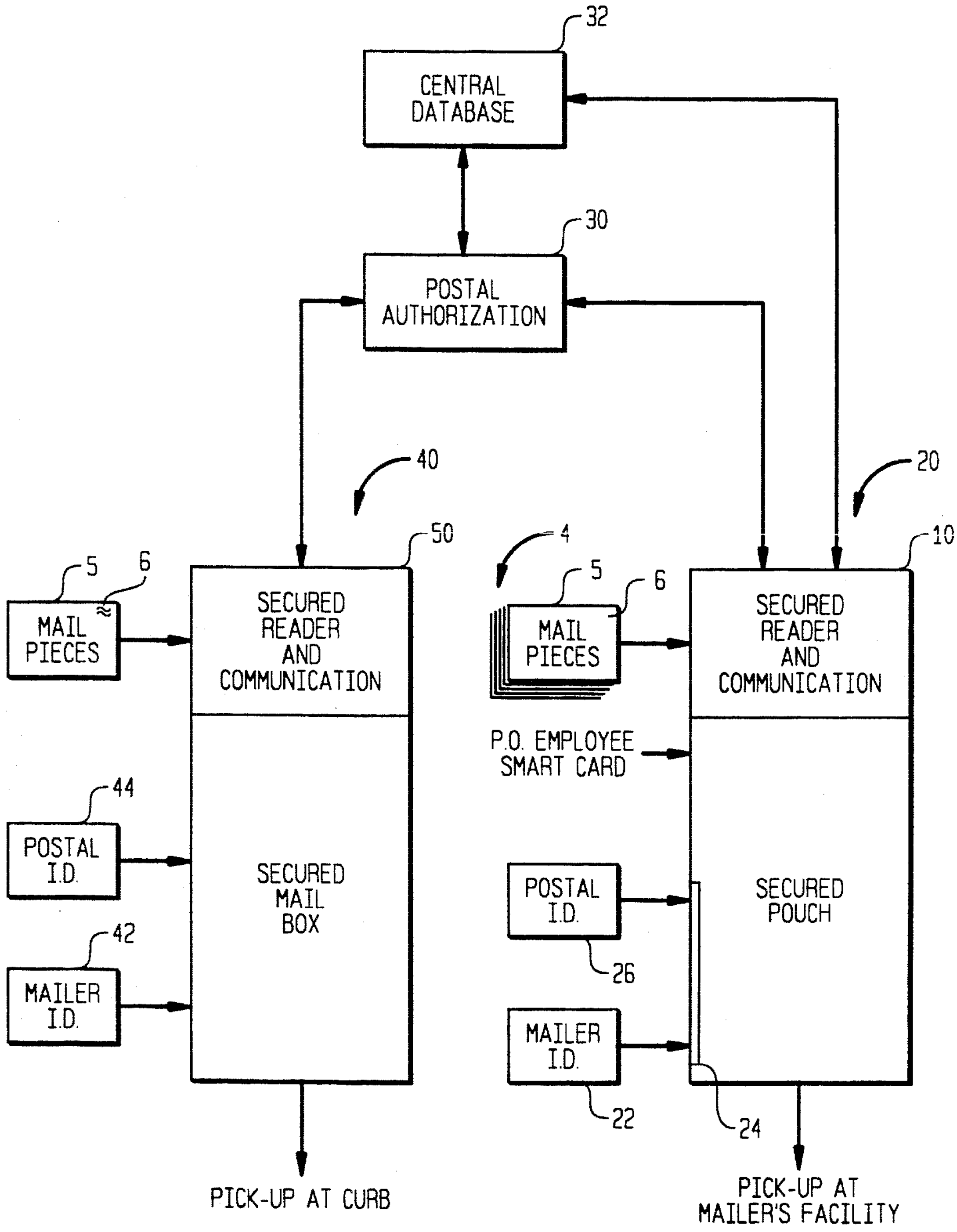
FIG. 1 is a block diagram of a secured pouch system in accordance With the present invention.
Figure 2:
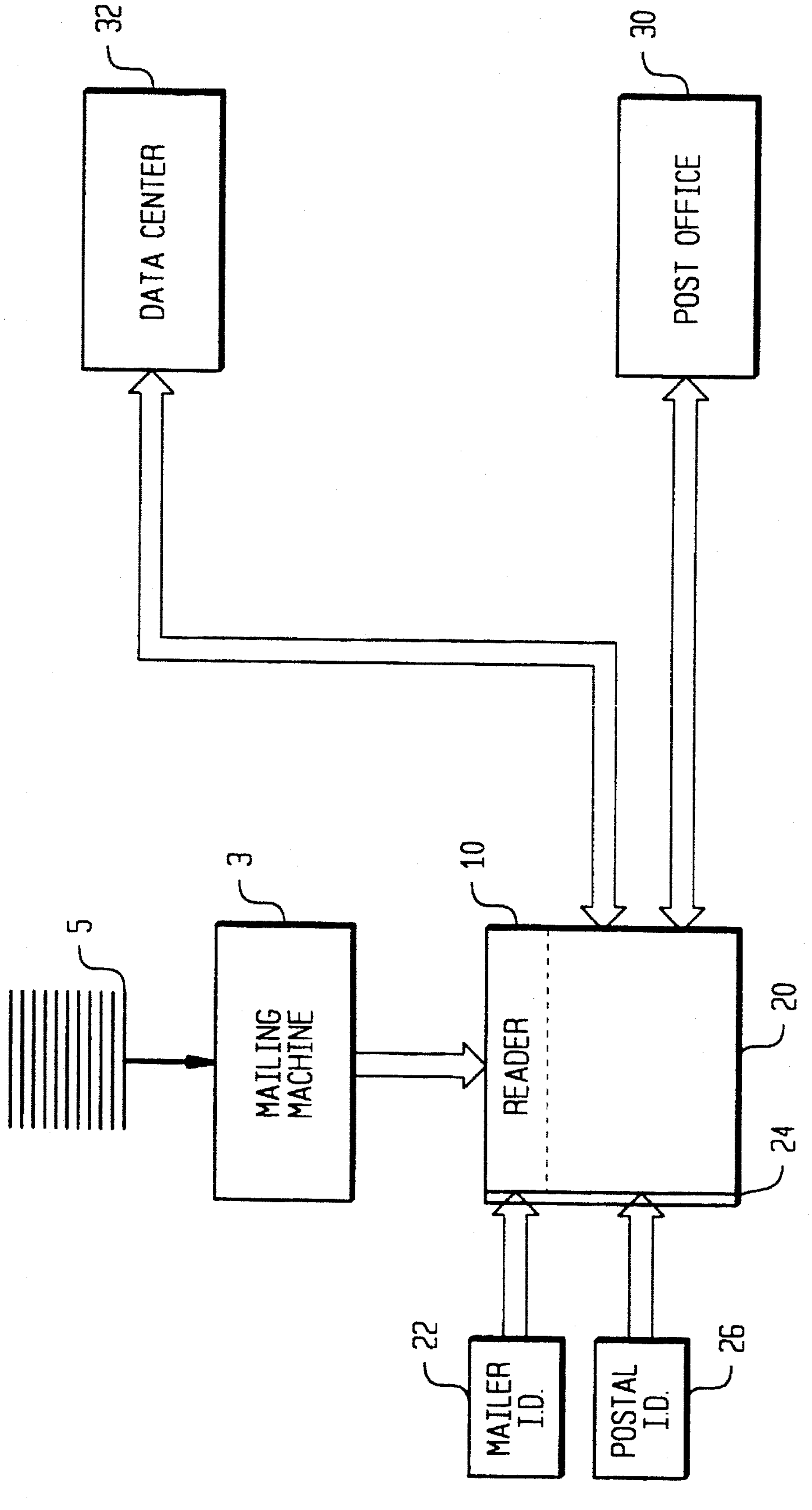
FIG. 2 is a block diagram of the secured pouch system FIG. 1 for high volume mailers.
Figure 3:
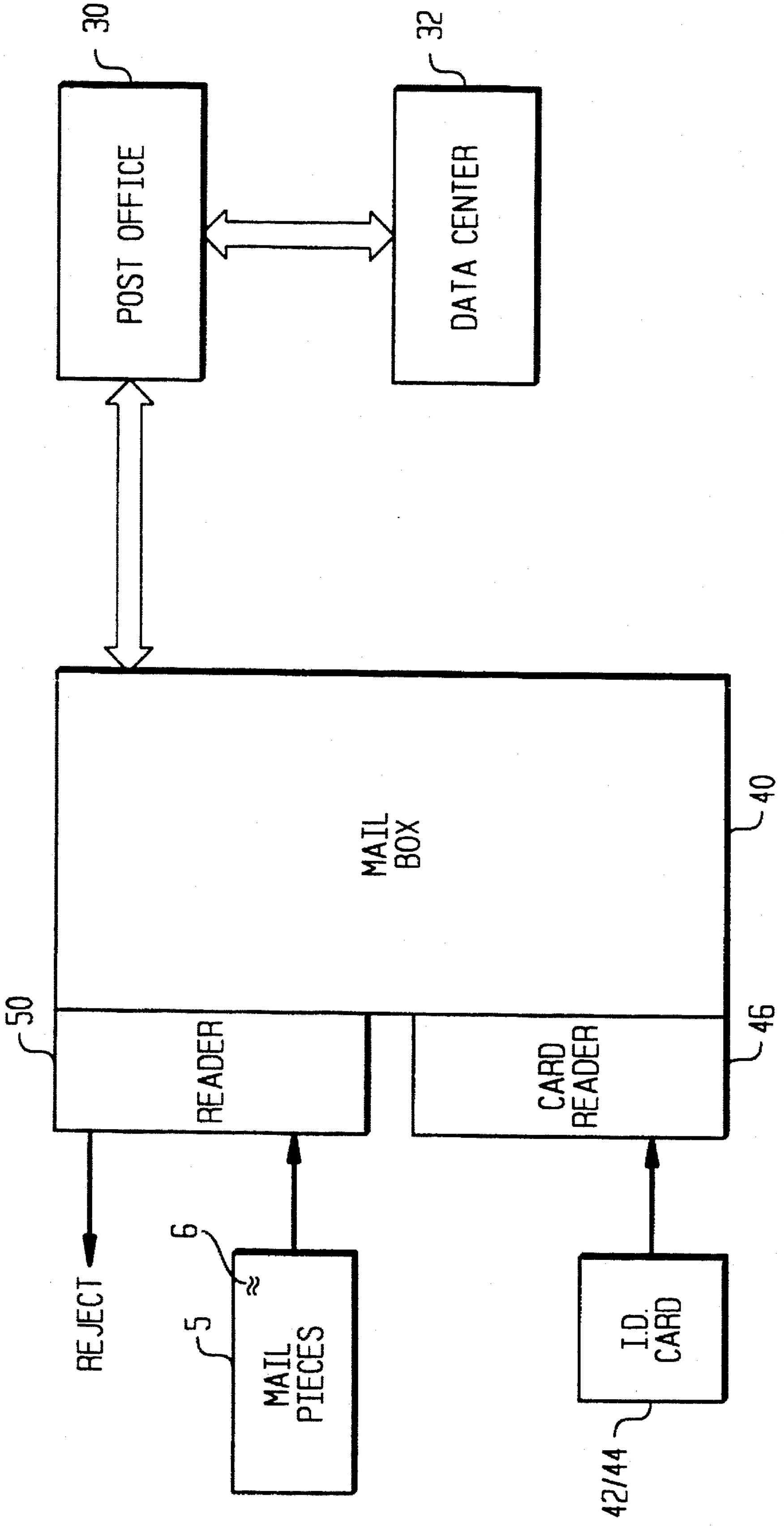
FIG. 3 iS a block diagram of the secured pouch system of FIG. 1 for low volume mailers.

In accordance with the present invention, a secured pouch system is shown in FIG. 1. The secured pouch system comprises two types of transactions—high volume mail processing by a mailer (FIG. 2); and low volume mail processing of mail delivered by a customer to a public or private mailbox (FIG. 3).

For high volume mailers, a batch, generally designated 4, of mailpieces 5 is assembled, for example on an inserter system including a mailing machine 3, with an indicia 6 printed on each of the mailpieces 5 indicating the appropriate postage printed thereon. Each of the mailpieces 5 in batch 4 is then read by a secured reader 10 that is coupled to a secure pouch 20. After each mailpiece 5 is read, it is deposited into secure pouch 20 as the postage and other desired information, such as mail address information, is accumulated for the batch of mailpieces. Pouch 20 includes a card reader 24 which reads mailer or postal identification cards 22 and 26 respectively. When the entire batch 4, or subset thereof, has been read, the mailer begins an approval procedure by placing into card reader 24 mailer identification card 22. The mailer then provides processing instructions to pouch 20 which then initiates a first call to the Post Office 30 for postal authorization. Pouch 20 sends to Post Office 30 the accumulated information relating to the mailpieces 5 of batch 4 that have been deposited into pouch 20. When postal authorization is returned, pouch 20 initiates a second call to a central database at Data Center 32, sends the accumulated amount in the pouch to the central database and requests authorization. Data Center 32 provides such authorization after confirming that funds are available for debiting mailer's account for the total amount of postage of mailpieces 5 in pouch 20. Once authorization is received from Data Center 32, mailpieces 5 in pouch 20 can be picked up from the mailer's facility. Such authorization is given based solely on funds being available for debiting from the account of the mailer before the mailpieces 5 in secured pouch 20 are accepted by the Post Office.

In the preferred embodiment of the present invention a further level of security is added to the authorization process. The postal employee that picks up the mail from the mailer's facility has an identification card 26, e.g., a smart card, that must be inserted into card reader 24 in pouch 20 with the mailer's identification card 22 before the calls can be initiated and authorization requested. The additional security is for the benefit of the mailer and the Post to ensure that the request for authorization is made at the time of pick up by the Postal employee. A further benefit, is that the Post can track the pick ups by its employee.

For low volume mailers, such as in general public or small business mail, the mailpieces 5 are brought by the mailer to a public or private "mailbox" 40 where the mailer inserts an identification smart card 42 that identifies an account to which the debit will occur for the postage due on mailpiece 5. Mailbox 40 includes a secured reader 50 for reading the indicia 6 and other desired information, such as the mail address. There is also a card reader 46 for reading a mailer or postal identification card 42. Mailbox 40 may also include means, such as a scale and postage rate processor, for determining correct postage due for each mailpiece.

The low volume mailer process begins when a mailer inserts mailpiece 5 into reader 50 and inserts a mailer identification card 42 into card reader 46. Mailbox 40 then initiates a call to Post Office 30 to obtain authorization and acceptance, sending at least mailer identification information and the amount of postage for the particular transaction. The Post Office 30 authorizes the transaction based on at least the mailer identification information and requests acceptance from Data Center 32. As with the large volume mailers, mailpieces 5 are accepted into Mailbox 40 (the secured pouch) when authorization is received from Data Center 32. If not accepted, the mailpiece 5 is returned to the mailer. In an alternate embodiment, the mailer brings the mail to a postal station, such as at a post office, where the mailer deposits the mailpieces in mailbox 40 and a postal employee initiates the authorization process with a postal employee identification card 44.

The communication initiated by the pouch is through telephone lines or other conventional communication systems depending on the location of the pouch. For example, if the pouch is on a postal truck or at a public mailbox, communication may be though radio transmission.

The present invention provides the following improvements to known postage metering systems: (1) the indicia is not critical because the security is not associated with the indicia; (2) the security is in the bank account of the customer/mailer; and (3) funds cannot be withdrawn without the authorization of the mailer identification card.

For small volume mailers, e.g., home use, digital printers can be used to print indicia.. The only requirement for the indicia is that it be readable. If the indicia cannot be read the responsibility for rejection has been shifted to the pouch, the mail truck or the mail box as the case may be.

It will be understood that the mail is processed differently by pouch 20 and mailbox 40 because of the inherent differences between large volume mail processing and low volume mail processing. In large volume mail processing pouch 20 interfaces with a mailing machine to accept information and mailpieces, and initiates communication with the post office and data center. When a mailpiece is accepted by pouch 20 the mailer is already known.

Figure 4:
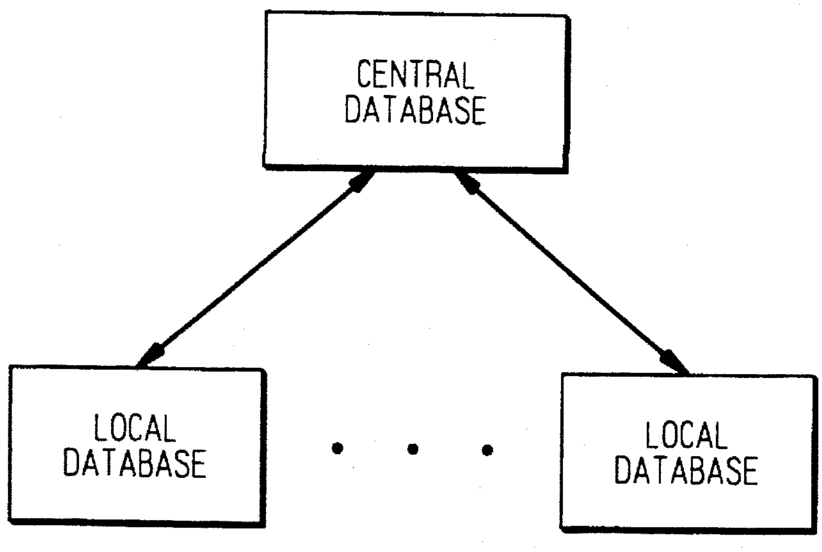
FIG. 4 is an alternate embodiment including a plurality of local databases.
Figure 5:
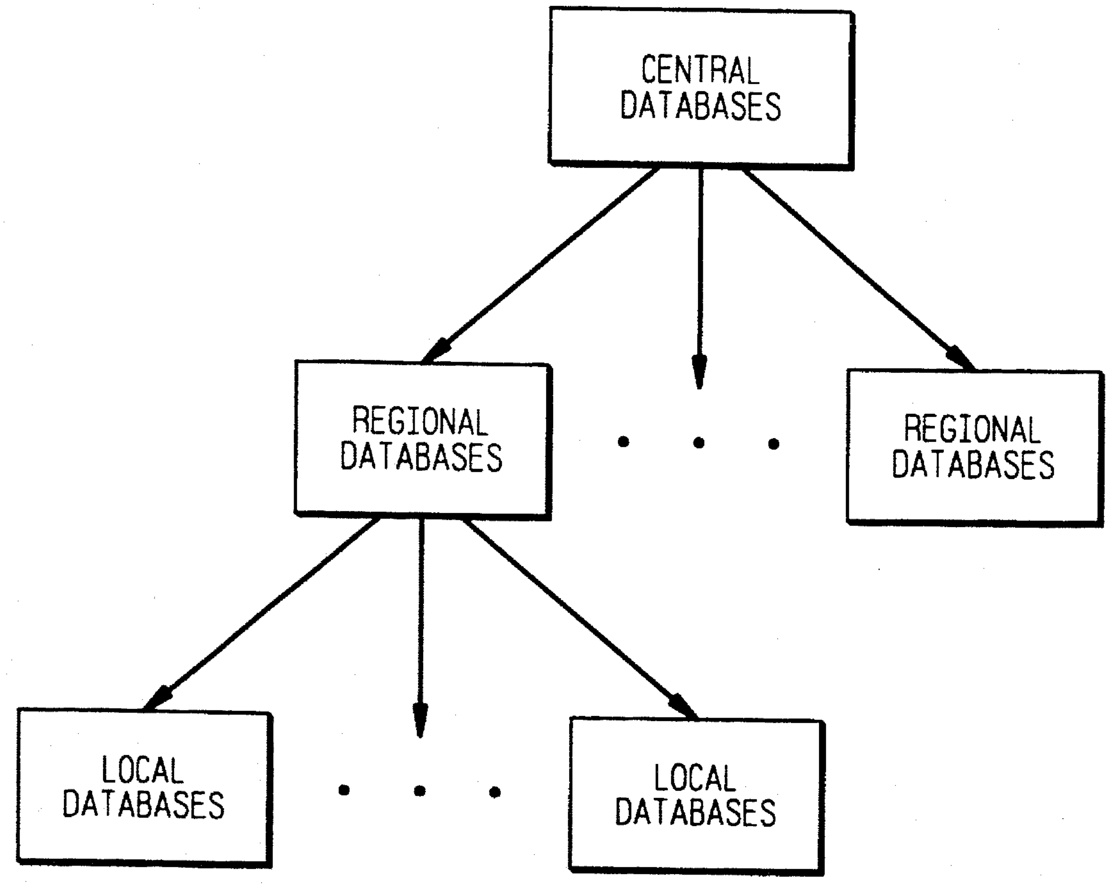
FIG. 5 is yet another embodiment including a network of databases from local to national domains.

When a mailpiece is mailed by an individual, the mailer is unknown until an identification card is inserter into card reader 46. The mailbox reads the letter and the identification card and calls the post office. The post office calls the data center which then sends authorization to the post office for acceptance of the mailpiece. The post office sends acceptance to the mailbox and the mailbox accepts the mailpiece. The speed of this transaction can be accelerated by having regional or local databases for certain types of cards, i.e., regional or local cards, that limit such mailing to such areas, thus eliminating the need for national access for everyone. Such regional or local databases can be structured to handle cities, towns and other local regions. Examples of the regional and local databases are shown in FIGS. 4 and 5.

The present invention represents an improved method of posting mail that not only improves security by eliminating risk to the Posts, but eliminates drawbacks that are associated with conventional methods. Referring now to FIG. 6, a comparison of conventional postage payment systems is provided in a table. The present invention is suitable for replacing all conventional methods of postage payment and can be implemented as a prepaid debit account or trust/credit account. The present invention is suitable for individual users to high volume mailers and is as convenient as using a credit card.

In the present invention, the security of the postage funds is improved over conventional methods because the Post accepts the mailpieces only after debiting or charging the mailer's account, i.e. funding of the postage is guaranteed. Furthermore, since the indicia no longer bears evidence of postage payment, there can be no fraud on the Posts because of counterfeit indicia. Finally, the postage transaction is controlled from a central location away from the mailer.

In addition to the elimination of security risk to the Post, there are several additional benefits derived from the present invention. It can replace all conventional methods of postage payment, and in doing so eliminates drawbacks associated with each method. For example, the present invention also eliminates the "junk mail" image associated with permit mail. Also, manifests for shipping or mailing can be done remotely in a standard manner with minimum audit. Since the system is entirely computerized, it can take advantage of the information highway as it develops and can be adapted to provide other services.

Furthermore, the present invention can provide quality control of the readability of the mailing address at the time of entry into the postal system. Such quality control can be achieved by including a reader with the pouch for reading the mailing address when the mailpiece enters is received by the pouch. It will be understood that reading mailing addresses at the point of entry into the postal system then facilitates further benefits such as scheduling and tracking the delivery of mailpieces.

Another benefit of the present invention is the communication network under which the present invention operate. Such a network allows two way communication whereby the Post Office or Data Center can request information from any or all of the secured pouches or mail boxes.

The system also retains benefits associated with conventional methods. For example, the system includes the benefits associated with dated and precancelled indicia and applies exact postage. Also, rates can be easily updated from the data center' to the local stations.

Referring now to Table 1 below, a comparison of the present invention is made to a conventional postage meter system.

TABLE 1

| CONVENTIONAL METER | PRESENT INVENTION (POUCH) |
|---|---|
| CUSTOMER MAKES FUNDS AVAILABLE TO DATA BASE OR PAYS DIRECTLY TO OFFICE OF THE POST | THE SAME BUT FUNDS PAID IN CASH, CHECK OR CREDIT CARD DIRECTLY TO THE OFFICE OF THE POST INSTEAD OF BEING LOADED TO A METER THEY ARE REPORTED TO THE DATA BASE OR DIRECTED TO THE DATA BASE. |
| FUNDS ARE TRANSFERRED TO METER | FUNDS STAY AT DATA BASE |
| BECAUSE FUNDS ARE IN METER TAMPERING IS POSSIBLE | FUNDS STILL IN DATA BASE, NOT AVAILABLE FOR TAMPERING |
| INDICIA IS PRINTED (CURRENCY HAS BEEN PRINTED) OPPORTUNITY FOR FRAUD | INDICIA IS PRINTED (NO CURRENCY VALUE) PRINTED INDICIA IS USED FOR INFORMATION ONLY: DATE CUSTOMER ID POSTAGE AMOUNT AUTHORIZATION TO START POSTAL TRANSACTION WHEN READ MONEY TRANSACTION NOT STARTED THEREFORE NO FRAUD POSSIBLE |
| MAIL FROM MAILING MACHINE TO STACKER | MAIL FROM MAILING MACHINE TO SECURED READING TRAY, BAG, ETC. INDICIA READ FOR POSTAGE ACCEPTANCE CHECK FOR INDICIA VALIDITY CALCULATE RUN TOTAL COMMICATE TO DATA BASE DATA BASE ACCEPTS OR REJECTS CHARGES IF AUTHORIZED PROCEED IF NOT CANCEL AND LOCK |
| MAIL IS PICKED UP | SECURED BAG IS PICKED UP ONLY AFTER VALIDATION PROCESS: VALIDATION DONE BY CHECKING INSERTION OF TWO SMART CARDS. ONE FROM THE CUSTOMER ONE FROM POSTAL EMPLOYEE AND PROCESSED BY DATA BASE. BOTH CARDS ARE UPDATED WITH NEW SECURED CODES. IN ADDITION OFFICE OF THE POST CAN ACCESS INFORMATION ON MAIL VOLUME BEING PICKED UP AS WELL AS PICK UP TRUCKS AND EMLOYEES LOCATION. |

While the present invention has been disclosed and described with reference to a single embodiment thereof, it will be apparent, as noted above that variations and modifications may be made therein. It is also noted that the present invention is independent of the machine being controlled, and is not limited to the control of inserting machines. It is, thus, intended in the following claims to cover each variation and modification that falls within the true spirit and scope of the present invention.

What is claimed is:

1. A system for securely metering mailpieces, comprising:

a data center including a central database;

a plurality of local stations, each of said local stations comprising:

means for reading indicia printed on a mailpiece, said indicia including an amount of postage for the mailpiece;

means for reading information from a mailer identification card;

means for requesting transaction authorization from a postal system;

means for initiating a transfer of the information read from said indicia and said mailer identification card to said central database; and secured pouch means for holding the mailpiece when the mailpiece is accepted by said data center;

said data center including means for comparing the indicia information and the mailer identification card information to records in the central database, and further including means for issuing authorization of the transaction when the said comparison means verifies that mailer has sufficient funds or credit to satisfy the amount of postage in the indicia.

2. The system of claim 1 wherein said data center communicates a rejection of the mailpiece to said local station when said data center determines mailer has insufficient funds or credit to satisfy said amount of postage.

3. The system of claim 1 wherein said indicia includes information relating to a date the indicia is printed, customer identification, and postage amount.

4. The system of claim 3 wherein said indicia further includes information relating to a mailing address.

5. The system of claim 1 wherein said local database stores information relating to the indicia printed on each mailpiece of a batch of mail, calculates a run total associated with said batch of mail and communicates said run total to said data center, said run total including total postage amount to be debited from said customer's account and wherein said authorization received from the data center is for the entire batch of mail.

6. The system of claim 1 wherein said secured pouch is picked up for distribution only after authorization is received for said secured pouch.

7. The system of claim 1 wherein said local station is at a public mailbox location.

8. The system of claim 1 wherein said local station is on a mail truck whereby said authorization of the mailpieces occurs when said mailpieces are picked up by the mail truck.

9. The system of claim 1 wherein said authorization of acceptance of the mailpiece is contingent on an acceptable credit check of the customer.

10. The system of claim 1 wherein the postal system communicates instructions to any of the local stations for gathering information from the local stations.

11. A method of metering mailpieces comprising the steps of:

printing an indicia on a mailpiece, said indicia including at least a postage amount;

reading said indicia at a local mall pick up location;

initiating communications from said local mall pick up location to a data center using a user identification card;

communicating at least said postage amount and a mailer identification to said data center;

determining at said data center that the mailer has sufficient funds or credit to satisfy the postage amount;

communicating an authorization to said local mall pick up location to accept said mailpiece in the secured pouch; and depositing the mailpiece into a secured pouch once said authorization is communicated to said local mail pick up location.

12. The method of claim 11 comprising the further steps of:

determining at said data center that the mailer has insufficient funds or credit;

communicating a denial of said authorization to said local mail pick up location; and rejecting the mailpiece from deposit in said secured pouch.

13. The method of claim 11 comprising the further steps of:

tracking the handling of the mailpiece based on information contained in the indicia.

* * * * *